United States Patent
Jin et al.

(10) Patent No.: US 11,802,246 B2
(45) Date of Patent: Oct. 31, 2023

(54) SYNERGISTIC EFFECTS AMONG MERCAPTAN SCAVENGERS

(71) Applicant: Baker Hughes Oilfield Operations LLC, Houston, TX (US)

(72) Inventors: Peng Jin, Houston, TX (US); Zhengwei Liu, Houston, TX (US); Jerry J. Weers, Richmond, TX (US); Sunder Ramchandran, Sugar Land, TX (US); Jagrut Jani, Sugar Land, TX (US); Scott Lehrer, The Woodlands, TX (US); Johnathon Brooks, Richmond, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 211 days.

(21) Appl. No.: 17/199,179

(22) Filed: Mar. 11, 2021

(65) Prior Publication Data
US 2022/0290055 A1    Sep. 15, 2022

(51) Int. Cl.
*C10G 19/00*    (2006.01)
*C09K 8/54*    (2006.01)
*C10G 29/20*    (2006.01)
*C10G 29/24*    (2006.01)

(52) U.S. Cl.
CPC ............... *C10G 19/00* (2013.01); *C09K 8/54* (2013.01); *C10G 29/20* (2013.01); *C10G 29/24* (2013.01); *C09K 2208/32* (2013.01); *C10G 2300/202* (2013.01)

(58) Field of Classification Search
CPC ........ C10G 19/00; C10G 29/20; C10G 29/24; C10G 2300/202; C09K 8/54; C09K 2208/32
See application file for complete search history.

(56) References Cited

U.S. PATENT DOCUMENTS

| | | | | |
|---|---|---|---|---|
| 1,998,863 | A | * | 4/1935 | Chaney ................. C10G 19/00 208/235 |
| 4,701,484 | A | * | 10/1987 | Chang ................. C08K 5/3445 524/705 |
| 5,780,641 | A | * | 7/1998 | Yerushalmi ............ A01N 59/00 8/107 |
| 6,117,310 | A | | 9/2000 | Rivers |
| 10,093,868 | B1 | | 10/2018 | Weers et al. |
| 10,316,256 | B2 | | 6/2019 | Engel et al. |
| 10,316,257 | B2 | | 6/2019 | Engel et al. |
| 10,633,601 | B2 | | 4/2020 | Weers |

(Continued)

FOREIGN PATENT DOCUMENTS

| | | |
|---|---|---|
| CN | 109772104 | 5/2019 |
| JP | 2005200456 | 7/2005 |
| WO | WO-2022122865 A1 * | 6/2022 |

*Primary Examiner* — Randy Boyer
*Assistant Examiner* — Juan C Valencia
(74) *Attorney, Agent, or Firm* — Crowe & Dunlevy, P.C.

(57) ABSTRACT

A combination of at least one basic compound, such as potassium hydroxide, together with at least one aldehyde donor can synergistically scavenge mercaptans from organic fluids, such as hydrocarbons, where "synergistically effective" is defined as the amount of mercaptans scavenged is greater as compared with a combination where either the basic compound or the reaction product is absent, used in the same total amount.

18 Claims, 2 Drawing Sheets

(56) References Cited

U.S. PATENT DOCUMENTS

| | | |
|---|---|---|
| 2002/0157989 A1 | 10/2002 | Gatlin et al. |
| 2016/0175769 A1 | 6/2016 | Kamoun |
| 2017/0298281 A1 | 10/2017 | Weers |
| 2019/0270940 A1 | 9/2019 | Bagaria |
| 2019/0329175 A1* | 10/2019 | Shimizu ................ B01D 53/48 |
| 2020/0109329 A1 | 4/2020 | De et al. |
| 2020/0157439 A1 | 5/2020 | De et al. |

* cited by examiner

SYNERGISTIC EFFECTS AMONG MERCAPTAN SCAVENGERS

TECHNICAL FIELD

The present invention relates to methods and compositions for scavenging mercaptans from fluids, and more particularly relates, in one non-limiting embodiment, to methods and compositions for synergistically scavenging mercaptans from organic fluid, such as hydrocarbon fluids.

TECHNICAL BACKGROUND

In the drilling, downhole completion, production, transport, storage, and processing of crude oil and natural gas, including mixed production and waste water associated with crude oil and gas production, and in the storage of residual fuel oil, mercaptans are often encountered. "Mixed production" is defined as the production of a mixture of hydrocarbons and water from a subterranean formation. The presence of mercaptans is objectionable because they have limited concentrations allowed in refined fuels to minimize reactions and damages to fuel system components. Another reason that mercaptans are objectionable is that they are often highly corrosive. These mercaptans tend to be with high molecular weight with 4 or more carbons. Still another reason that mercaptans are undesirable is that they have highly noxious odors. The odors resulting from mercaptans are detectable by the human nose at comparatively low concentrations and are well known. For example, mercaptans, with low molecular weight with less than 3 carbons, are used to odorize natural gas and used as a repellant by skunks and other animals. As defined herein, "mercaptans", also known as "thiols" are any of a group of organic compounds resembling alcohols, but having oxygen of the hydroxyl group replaced by sulfur, as in ethanediol ($C_2H_5SH$).

The predominant hydrogen sulfide scavengers for natural gas and crude oil are water soluble monoethanolamine (MEA) triazines and monomethylamine (MMA) triazines. These compounds contain nitrogen and when used in sufficient concentration may cause problems for certain refineries. Glyoxal ($C_2H_2O_2$) or acrolein ($C_3H_4O$) have been used as $H_2S$ scavengers in instances where a nitrogen-containing $H_2S$ scavenger is not desired. Glyoxal is a slow acting scavenger and may be corrosive to mild steel. Acrolein is effective scavenger but an extremely toxic substance which operators do not like to use. These $H_2S$ scavengers sometimes were used to scavenge low molecular weight mercaptans, which cause odor issues.

A method for scavenging sulfhydryl compounds from sour hydrocarbon substrates, such as crude oils, refined distillate streams, and natural gas, by mixing the substrates with preferably substantially water free bisoxazolidines is described U.S. Pat. No. 6,117,310 to Baker Hughes.

U.S. Pat. No. 10,093,868 to Baker Hughes describes the treatment of hydrocarbon streams, e.g. gasoline, with basic ionic liquids (ILs), which results in reduction of the sulfur compounds such as $H_2S$, thiophenes, disulfides, thioethers, and/or mercaptans that are present thereby removing these compounds. The IL is a quaternary ammonium compound having the formula $R_4N^+X^-$ or $X^-R_3N^+R'N^+R_3X^-$, where R is independently an alkyl group, an alkylbenzyl group, a hydroxyalkyl group, or a hydroxyalkylbenzyl group, and R is straight or branched and has 1-22 carbon atoms, R' is a straight or branched alkylene or oxyalkylene having 1 to 10 carbon atoms, and where $X^-$ can be hydroxide, carbonate, alkylcarbonate, bicarbonate or alkoxide, where the alkyl group of the alkylcarbonate or alkoxide, if present, is straight or branched and has 1 to 8 carbon atoms. The ILs can be used in applications where liquid or gaseous hydrocarbon fluids are treated by direct injection or by extraction.

Treatment of streams containing hydrogen and/or hydrocarbons, and in one non-limiting embodiment refinery distillates, with alkyl carbonates, such as dimethylcarbonate, alone or together with at least one solvent results in reduction or removal of hydrogen sulfide ($H_2S$) that is present to give easily removed alkyl sulfides and/or mercaptans as described in U.S. Pat. No. 10,633,601 to Baker Hughes. In one non-limiting embodiment, the treatment converts the original hydrogen sulfide into alkyl sulfides and/or mercaptans that can be extracted from the stream with caustic solutions, mercaptan scavengers, solid absorbents such as clay or activated carbon or liquid absorbents such as amine-aldehyde condensates and/or aqueous aldehydes.

It would be desirable if new methods and compositions of mercaptan scavengers could be discovered which are very effective, but which are more efficient and increases the reaction rate as compared with prior scavengers.

SUMMARY

There is provided in one non-limiting embodiment a method for scavenging mercaptans from an organic fluid containing mercaptans, where the method involves contacting the organic fluid with a combination of at least one basic compound, such as alkaline metal bases or amine bases, and at least one aldehyde donors including reaction products such as, but not limited to, amine-aldehyde reaction products, alcohol-aldehyde reaction products, aldehyde oligomers, acrolein, acrolein trimer, glyoxal dimer, diazolidinyl urea, imidazolidinyl urea, dimethylol ethyleneurea, hydantoin, DMDM hydantoin, MDM hydantoin, 2-bromo-2-nitro-propane-1,3-diol, quaternium-15 (1-(3-chloroallyl)-3,5,7-triaza-1-azoniaadamantane chloride), trishydroxymethylnitromethane, N-methylol-chloracetamide, (4,5-dihydroxy-1,3-bis(hydroxymethyl)-imidazolidin-2-one, methylated), dimethyloldihydroxyethyleneurea, dimethylolpropyleneurea, dimethylol urea, ethylene urea, glyoxal urea, polyoxymethylene urea, sodium hydroxmethyl glycinate, and combinations thereof in a synergistically effective amount for synergistically scavenging mercaptans, where "synergistically effective" is defined as the amount of mercaptans scavenged is greater as compared with a combination where either the basic compound or the aldehyde donor is absent, used in the same total amount.

There is additionally provided in one non-restrictive version, a composition for scavenging mercaptans from an organic fluid, where the composition includes at least one basic compound that is an alkaline metal base and/or an amine base; and at least one aldehyde donor as defined above.

Further, there is also provided an organic fluid treated to scavenge mercaptans therefrom, which fluid includes an organic fluid comprising mercaptans, and a combination in a synergistically effective amount for synergistically scavenging mercaptans, where the combination includes at least one basic compound that is an alkaline metal base and or an amine metal base, together with at least one aldehyde donor which in one non-limiting version, is an amine-aldehyde reaction product and/or an alcohol-aldehyde reaction product. The definition of "synergistically effective" is the same as that given above.

Any of these methods may optionally include demulsifiers, hydrate control, scale control, paraffin control and asphalting control chemicals, and the like.

Any of these methods may optionally include corrosion inhibitors including, but not necessarily limited to phosphate esters, acetylenic alcohols, fatty acids and/or alkyl-substituted carboxylic acids and anhydrides, phosphates esters and/or polyphosphate esters, quaternary ammonium salts, imidazolines, sulfur-oxygen phosphates, azoles, and the like, and combinations thereof.

DETAILED DESCRIPTION

Figure 1:
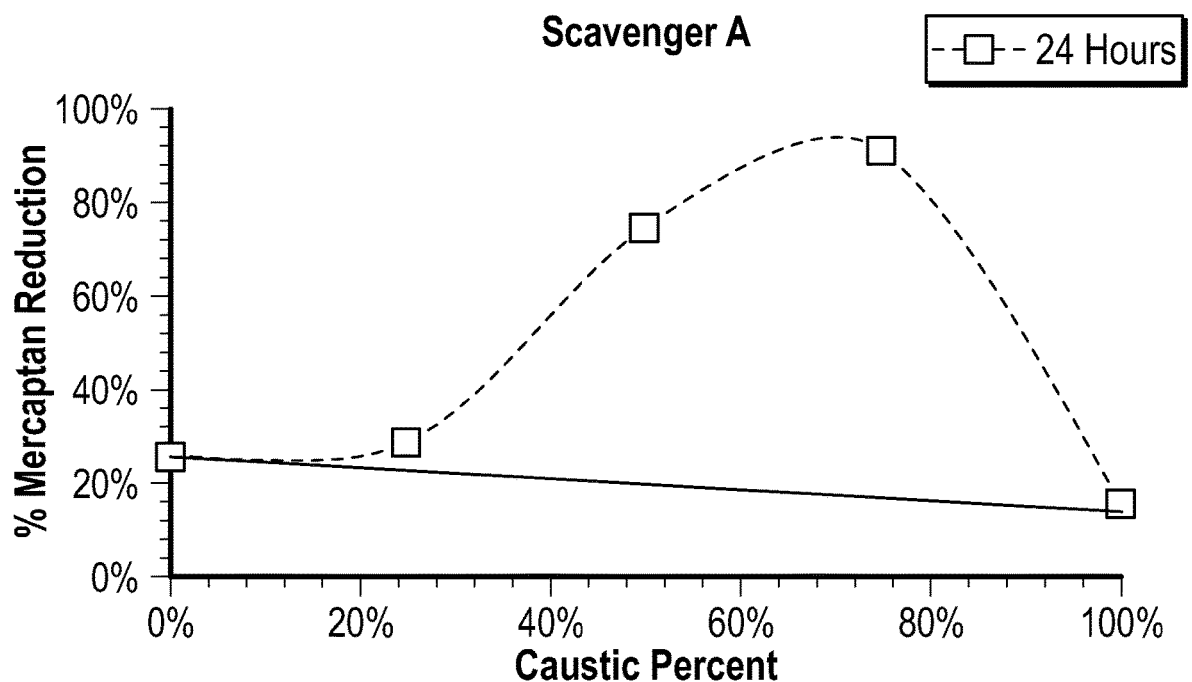
FIG. 1 is a graph of % mercaptan reduction as a function of different combinations of caustic solution and Scavenger A.

It has been surprisingly discovered that combinations of at least one basic compound, and an aldehyde donor remove mercaptans present in organic fluids more completely and faster than either of the components used alone at the same total concentrations in the mixture. The process by which the mercaptans are effectively removed from organic fluids involves introducing a synergistic combination of at least one basic compound, and at least one aldehyde donor into the mercaptan-containing system. To be clear, the aldehyde donors are different from the basic compounds herein. The synergistic scavenger combination significantly increases the reaction rate and the overall scavenging efficiency over each of the components used alone, but at the same total amount. The synergy may be seen from the data discussed below.

The organic fluid containing mercaptans can include, but is not necessarily limited to hydrocarbon fluids or mixtures of hydrocarbon fluids with water, specifically, but not limited to crude oil, mixtures of oil and water and gas, such as results from mixed production or transportation/distribution or storage or refining processes.

In specific applications to remove mercaptans from organic fluids, the mercaptan scavenger combination may be introduced in the fluid, e.g. crude oil (or other fluid) at dosages of mass ratios of scavenger combination to mercaptans in the fluid of from about 99:1 independently to about 1:5 or even 1:20; on the other hand from about 50:1 independently to about 1:1; in another non-limiting embodiment from about 18:1 or 10:1 independently to about 5:1; in a different embodiment from about 15:1 independently to about 3:1; alternatively from about 12:1 independently to about 2:1 ppm. As used herein with respect to a range, the term "independently" when used in connection with a range means that any threshold may be combined with any other threshold to give a valid or suitable alternative range. In a non-limiting example, a suitable range can be from 10:1 to 3:1.

It is expected that many basic compounds may find at least some utility in the mercaptan scavenger compositions described herein. However, to give a better understanding, specific examples of suitable basic compounds include, but are not necessarily limited to, alkali metal hydroxides such as sodium hydroxide (NaOH), potassium hydroxide (KOH) and calcium hydroxide; sodium methoxide ($CH_3NaO$); potassium methoxide; monoethanolamine (MEA); polyamines including, but not necessarily limited to, diethylenetriamine (DETA); triethylene tetramine, tetraethylenepentamine, and the like; sodium carbonate; potassium carbonate; calcium carbonate; sodium phosphate; potassium phosphate; calcium phosphate; sodium silicate; potassium silicate; calcium silicate; and the like and combinations thereof. NaOH and KOH are typically used in aqueous solutions, in a non-limiting example 45 wt % KOH in water. Sodium or potassium methoxide does not require water and can be usefully employed in non-aqueous solutions to avoid adding water to the system or method.

It is also expected that the scavenger components include at least one aldehyde donor in the scavenger combination. As defined herein, "aldehyde donor" encompasses chemicals that release aldehyde where the aldehyde subsequently reacts with mercaptans to scavenge them from the organic fluid. "Aldehyde donor" also encompasses reaction products including, but not limited to, amine-aldehyde reaction products, alcohol-aldehyde reaction products which react directly with mercaptans without an aldehyde releasing step. In other words, aldehyde donor as defined herein may act either directly with mercaptans in the organic fluid or may act by releasing an aldehyde (in all of these cases, formaldehyde), and thus the method is not restricted to a specific mechanism unless otherwise noted.

Suitable, more specific aldehyde donors include, but are not necessarily limited to, amine-aldehyde reaction products, alcohol-aldehyde reaction products, aldehyde oligomers, acrolein, acrolein trimer, glyoxal dimer, diazolidinyl urea, imidazolidinyl urea, dimethylol ethyleneurea, hydantoin, DMDM hydantoin, MDM hydantoin, 2-bromo-2-nitropropane-1,3-diol, quaternium-15 (1-(3-chloroallyl)-3,5,7-triaza-1-azoniaadamantane chloride), trishydroxymethylnitromethane, N-methylol-chloracetamide, (4,5-dihydroxy-1,3-bis(hydroxymethyl)-imidazolidin-2-one, methylated), dimethyloldihydroxyethyleneurea, dimethylolpropyleneurea, dimethylol urea, ethylene urea, glyoxal urea, polyoxymethylene urea, sodium hydroxmethyl glycinate, and combinations thereof. Suitable amine aldehyde condensates include, but are not necessarily limited to, 3,3'-methylenebis-5-methyloxazolidine (MBO) (the reaction product of formaldehyde with an alkanolamine), MEA triazine and/or MMA triazine. Suitable alcohol aldehyde reaction products include, but are not necessarily limited to, (ethylenedioxy)dimethanol (EDDM) which is a reaction product of formaldehyde and ethylene glycol, butyl hemiformal (the reaction product of n-butyl alcohol with paraformaldehyde), benzyl hemiformal (the reaction product of benzyl alcohol with paraformaldehyde), methoxymethanol (the reaction product of aqueous formaldehyde with methanol) and the like and combinations thereof. Other suitable aldehyde reactants include, but are not necessarily limited to, glyoxal, glutaraldehyde, cinnamaldehyde, benzaldehyde, butyraldehyde, propionaldehyde, acetaldehyde, formaldehyde, paraformaldehyde, and acrolein, and the like and combinations thereof.

In one non-limiting embodiment, the amount of weight ratio of at least one basic compound in the total composition with aldehyde donor scavenger components (not accounting for any solvent) ranges from about 99:1 independently to about 1:20 alternatively from about 15:1 independently to about 1:5, and in another non-restrictive version from about 3:1 to about 1:1.

The weight ratio of the at least one basic compound to aldehyde donor ranges from about 1:20 independently to about 999:1 or alternatively to about 99.5 to 0.5; on the other hand 1:10 independently to about 98:2; alternatively from about 25:75 independently to about 95:5; in another non-limiting version from about 50:50 independently to about 90:10.

The weight ratio of the at least one basic compound to aldehyde donor is at least 1:10 and in a different non-limiting embodiment ranges from about 25:75 independently to about 98:2; alternatively from about 30:70 independently to about 95:5; in another non-limiting version from about 40:60 independently to about 90:10.

The weight ratio of the at least one basic compound to combinations of aldehyde donors, and in particular amine-aldehyde reaction products and alcohol-aldehyde reaction products is at least 1:10 and in a different non-limiting embodiment ranges from about 40:60 independently to about 98:2; alternatively from about 45:65 independently to about 95:5; in another non-limiting version from about 50:50 independently to about 90:10.

The suitable solvents for the mercaptan scavenger compositions herein include, but are not necessarily limited to, water or brine, in the embodiment where NaOH and or KOH are used, and in the case where sodium methoxide is used, Aromatic 100, ISOPAR M, kerosene, mineral oil, alcohols, glycols, esters and mixtures thereof may be used.

It has been discovered that the components of the mercaptan scavenger composition, i.e. the basic compound and the aldehyde donor may be added together to the organic fluid and/or may be added separately. Of course, the synergistic results are not obtained until the basic compound and the aldehyde donor come together in the fluid.

It has been surprisingly discovered that the amount of mercaptans scavenged is greater as compared with an otherwise identical composition with respect to at least one basic compound and the aldehyde donor, where the at least one basic compound or aldehyde donor is absent and vice versa. This effect is true for the same total amount of active components.

It has been found that water-soluble formulations and oil-soluble formulations of these compounds act as mercaptan scavengers when the mercaptan is present in an organic phase, a gaseous phase and a hydrocarbon phase, or any of these phases alone or together, or in combination with an aqueous phase. These methods and compositions may be used to remove mercaptans present in natural gas produced from natural gas wells. They may also be used to remove mercaptans from crude oil. Additionally they may be used to remove mercaptans from brines and other aqueous solutions containing them when these aqueous fluids are present together with an organic and/or hydrocarbon phase. Stated another way, the scavenging composition is expected to remove mercaptans in hydrocarbon gas streams, hydrocarbon liquid streams, and/or mixed production streams that contain all three phases.

It has been additionally surprisingly found that the methods and components described herein remove higher mercaptans from the organic liquids described herein. It is known that it is difficult to remove higher mercaptans from organic fluids, particularly hydrocarbon fluids and mixtures of hydrocarbon fluids with water. In one non-limiting embodiment, "higher mercaptans" are defined as mercaptans that are $C_3$ or higher in carbon number; alternatively as $C_4$ or higher in carbon number; and in another non-restrictive version as $C_5$ or higher in carbon number. In another non-limiting embodiment "higher mercaptans" are defined as non-volatile mercaptans and/or as non-odor causing mercaptans. It is important to remove higher mercaptans for downstream gasoline production.

More specifically, the mercaptan scavengers are expected to be useful in a wide variety of applications, particularly "upstream" and "downstream" applications (upstream and downstream of a refinery) including, but not necessarily limited to, residual fuel oil, jet fuel, bunker fuel, asphalt, recovered aqueous streams, as well as mixed production streams, for instance downhole or downstream of wellhead, including, but not limited to scavenging $H_2S$ and mercaptans from production fluids. In one non-limiting embodiment the method is practiced in a refinery. The primary applications within a refinery involve hydrocarbon liquid phases and hydrocarbon gaseous phases. The treatment methods for mercaptan scavenging may also be practiced in transportation and distribution systems and vessels, and storage terminals including conduits leading to and from storage terminals. The methods can also be practiced in waste water treatment facilities, geothermal systems, and mining operations. Each of these methods may require different treatment specifications from each other.

When the method scavenges mercaptans from a gaseous phase, the method may be practiced by contacting the gaseous phase with droplets of the composition, and/or passing the gaseous phase through the composition, such as by bubbling through a tower.

The scavenging compositions described herein may also optionally include demulsifiers and other chemicals added previously or subsequently. In one non-limiting example, scale inhibitors may be added to prevent solids formation, in a non-limiting example a high pH additive. Additional additives can be corrosion inhibitors including, but not necessarily limited to, phosphate esters, acetylenic alcohols, fatty acids and/or alkyl-substituted carboxylic acids and anhydrides, phosphates esters and/or polyphosphate esters, quaternary ammonium salts, imidazolines, sulfur-oxygen phosphates, and the like and combinations thereof.

The scavenger combinations and methods herein may be used under a wide variety of conditions, including, but not necessarily limited to normal crude oil storage, transportations and processing temperatures, as well as temperatures of oil and gas production fluids, in one non-limiting embodiment from about 30° F. (about -1° C.) to about 350° F. (about 177° C.). However, these temperature ranges are not limiting for applications such as production and downstream processes such as desalting washes and the like. In one non-limiting embodiment, the organic fluid comprises, consists essentially of, or consists of an alkaline wash stream. Such streams may be present in separation operations that use an extraction technique such as a contact tower or caustic wash unit.

The invention will now be illustrated with respect to certain examples which are not intended to limit the invention in any way but simply to further illustrate it in certain specific embodiments. Percentages are weight percentages unless otherwise noted.

EXAMPLES

In all Examples, the organic fluid was a hydrocarbon fluid containing 600 wt ppm of mercaptan sulfur, based on sulfur as obtained from the ASTM UOP163® titration method. This organic fluid was mixed with 2400 wt ppm of mixture of 45 wt % KOH caustic solution and various scavengers of aldehyde donor, in particular amine aldehyde or alcohol aldehyde reaction products. On the left side (y-axis) of each Figure indicates the wt % mercaptan sulfur removal. On the bottom side (x-axis) the % caustic composition of the mixture of caustic and various aldehyde reaction products as defined herein. Results are presented for 24 hours of contact. Data were also collected for 6 hours of contact but are not presented herein as they largely track the 24 hour contact data.

More specifically, in FIG. 1, Scavenger A is a commercially used MEA/triazine reaction product. As can be seen on the left side of FIG. 1, the wt % mercaptan removal when 0% caustic solution (2400 ppm Scavenger A) is used was about 22 wt %; where the wt % mercaptan removal when 100% caustic (2400 ppm caustic solution and no Scavenger A) was about 10 wt %. The solid line is the expected 24 hour performance between the extremes of 0% caustic solution (2400 ppm Scavenger A) and 100% caustic (2400 ppm Caustic solution and no Scavenger A). Any results above these lines are considered synergistic by the definition used herein. Thus, it may be seen that synergistic results occur from mixtures of about 1800 ppm Scavenger A/600 ppm KOH solution (a ratio of 25% to 75% caustic to Scavenger A to mixtures of about 600 ppm Scavenger A/1800 ppm KOH solution in FIG. 1, even to a ratio of 98:2 caustic to Scavenger A. Surprisingly, 90% reduction rate was achieved when 75% caustic solution is used. This indicates a surprising synergy was obtained between the two components, especially in the region rich in caustic solution.

Figure 2:
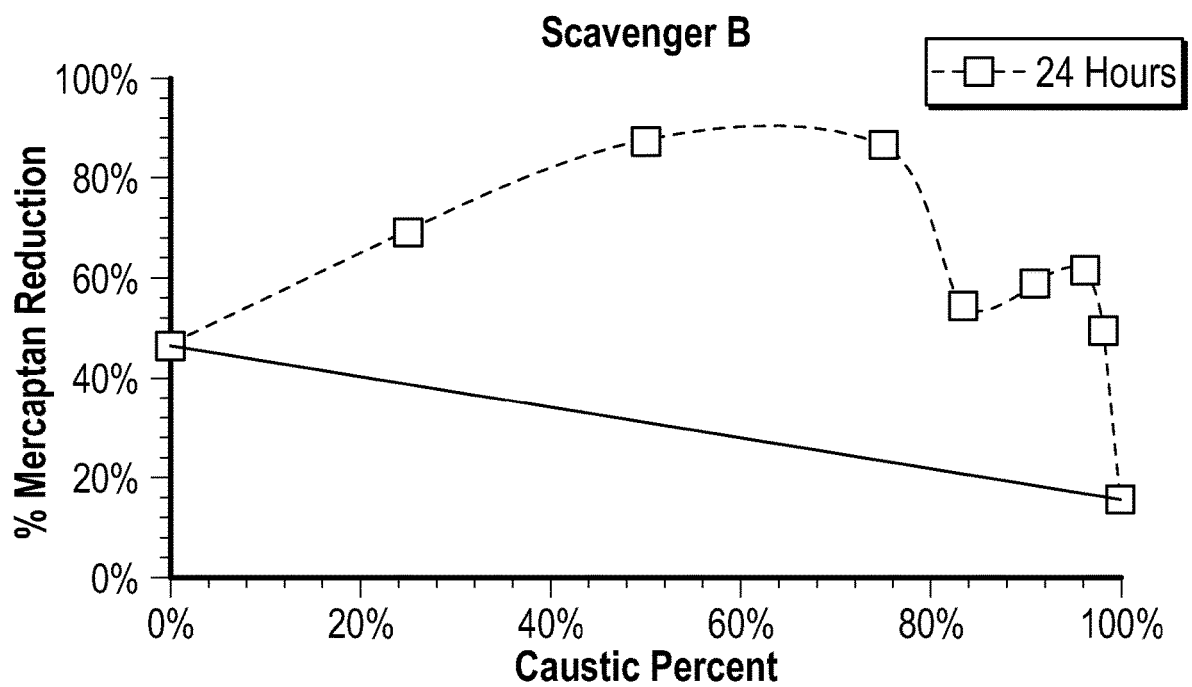
FIG. 2 is a graph of % mercaptan reduction as a function of different combinations of caustic solution and Scavenger B as described herein.

FIG. 2 presents results when the novel combination of KOH and Scavenger B (MBO) are used together, and illustrates the synergistic results of the method. The solid line is the expected performance between the extremes of 2400 ppm Scavenger B (0% caustic solution) and 0 ppm Scavenger B (100% caustic). Any results above these lines are considered synergistic by the definition used herein. Thus, it may be seen that synergistic results occur from mixtures of about 1800 ppm Scavenger B/600 ppm KOH solution (even 5% caustic to 95% Scavenger B) to mixtures of about 600 ppm Scavenger B/1800 ppm KOH solution in FIG. 2 (even 98% caustic to 2% Scavenger B.

Figure 3:
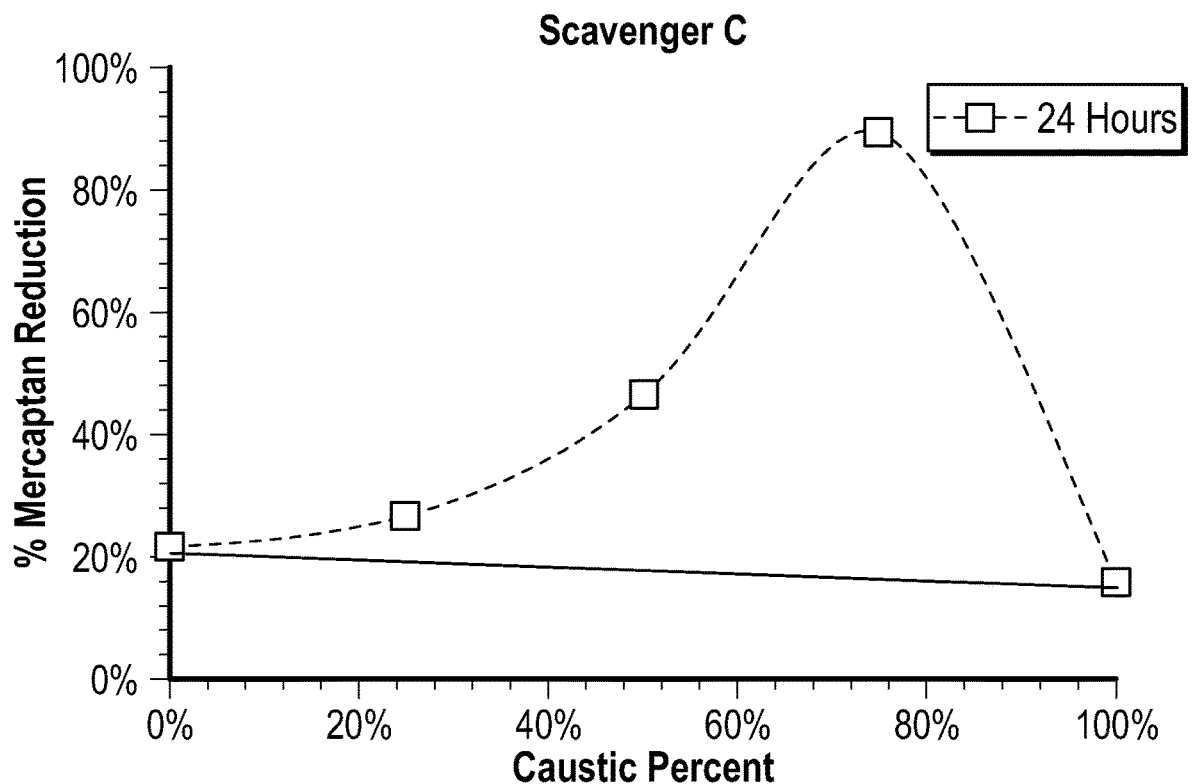
FIG. 3 is a graph of % mercaptan reduction as a function of different combinations of caustic solution and Scavenger C as described herein.

FIG. 3 presents the results of the KOH solution and Scavenger C used alone (left and right sides, respectively) and together. Scavenger C is an alcohol aldehyde reaction product. It may be seen that synergistic scavenging occurs at a ratio of from about 25% caustic to about 75% Scavenger C to a ratio of about 95% caustic to about 5% Scavenger C.

Figure 4:
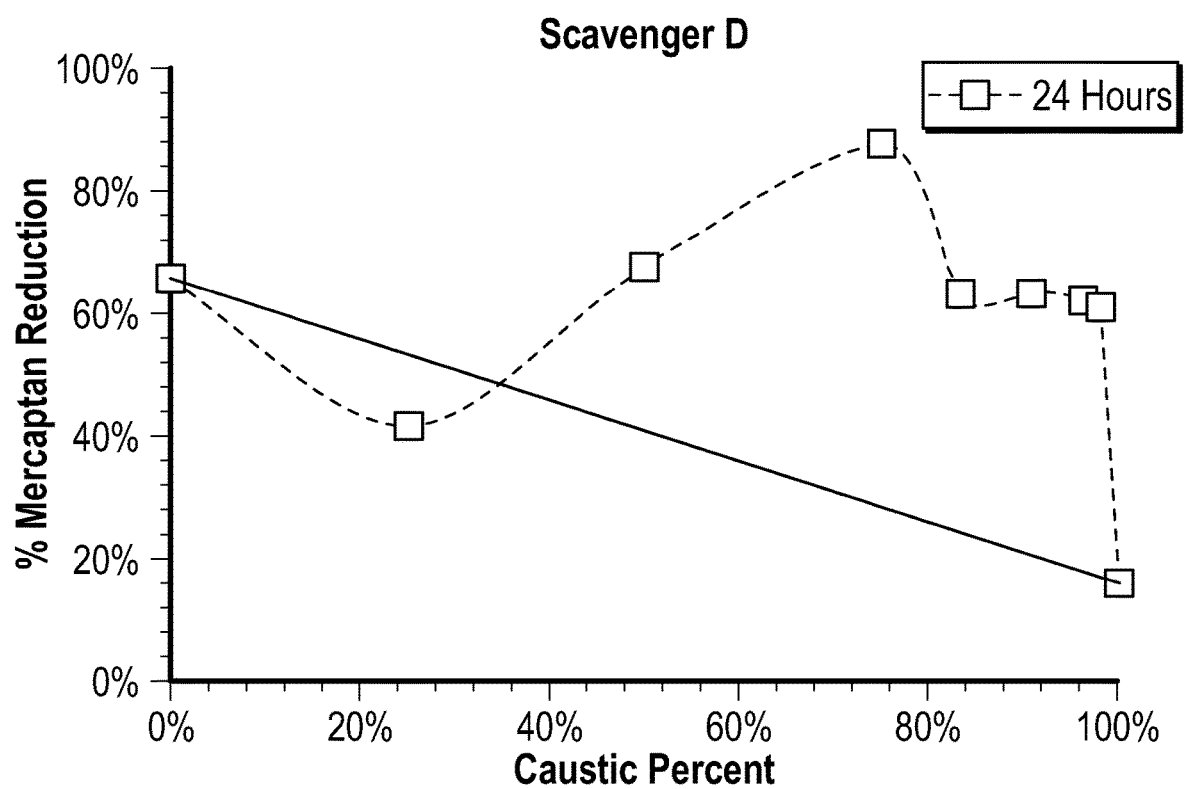
FIG. 4 is graph of % mercaptan reduction as a function of different combinations of caustic solution and Scavenger D as described herein.

In FIG. 4, Scavenger D is a combination of Scavengers B and C. Synergistic results are seen in FIG. 4 for a relatively narrower range of from 1200 ppm Scavenger D/1200 ppm KOH solution to 600 ppm Scavenger D/1800 ppm KOH solution; or in another non-limiting embodiment, from about 40% caustic to about 60% Scavenger D to about 98% caustic to about 2% Scavenger D.

In the foregoing specification, the invention has been described with reference to specific embodiments thereof, and has been demonstrated as effective in providing methods and compositions for scavenging mercaptans from organic fluids, hydrocarbon fluids, gaseous phases and/or combinations thereof, optionally also containing water. However, it will be evident that various modifications and changes can be made thereto without departing from the broader scope of the invention as set forth in the appended claims. Accordingly, the specification is to be regarded in an illustrative rather than a restrictive sense. For example, specific basic compounds, amine aldehyde condensates, and solvents falling within the claimed parameters, but not specifically identified or tried in a particular composition or method or proportion, are expected to be within the scope of this invention.

The words "comprising" and "comprises" as used throughout the claims is interpreted as "including but not limited to".

The present invention may suitably comprise, consist or consist essentially of the elements disclosed and may be practiced in the absence of an element not disclosed. For instance, in a method for scavenging mercaptans from a fluid selected from an organic fluid, the method may consist essentially of, or consist of contacting the organic fluid with a combination in a synergistically effective amount for synergistically scavenging mercaptans, where the combination comprises, consists essentially of, or consists of at least one basic compound and at least one aldehyde donor, optionally with at least one amine aldehyde condensate, where "synergistically effective" is as defined herein.

Alternatively, in a composition for scavenging mercaptans from an organic fluid, the composition may consist of, or consist essentially of, at least one basic compound, and at least aldehyde donor which can be at least one amine aldehyde condensate and/or at least one alcohol aldehyde condensate.

There may be further provided in a non-limiting embodiment, a fluid treated to scavenge mercaptans therefrom, where the fluid consists essentially of or consists of an organic fluid comprising mercaptans, and a combination in a synergistically effective amount for synergistically scavenging mercaptans, where the combination comprises, consists essentially of, or consists of at least one basic compound and at least one aldehyde donor. The aldehyde donor can comprise, consist essentially of, or consist of at least one amine aldehyde condensate and/or at least one alcohol condensate, where "synergistically scavenging" is as defined herein.

As used herein, the singular forms "a," "an," and "the" are intended to include the plural forms as well, unless the context clearly indicates otherwise.

As used herein, the term "and/or" includes any and all combinations of one or more of the associated listed items.

As used herein, relational terms, such as "first," "second," "top," "bottom," "upper," "lower," "over," "under," etc., are used for clarity and convenience in understanding the disclosure and do not connote or depend on any specific preference, orientation, or order, except where the context clearly indicates otherwise.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for scavenging mercaptans from an organic fluid containing mercaptans, the method comprising:

contacting the organic fluid with a combination in a synergistically effective amount for synergistically scavenging mercaptans, where the combination comprises:
  at least one basic compound selected from the group consisting of sodium hydroxide (NaOH), potassium hydroxide (KOH), calcium hydroxide, sodium methoxide ($CH_3NaO$), potassium methoxide, diethylenetriamine (DETA), triethylene tetramine, tetraethylenepentamine, sodium carbonate, potassium carbonate, calcium carbonate, sodium phosphate, potassium phosphate, calcium phosphate, sodium silicate, potassium silicate, calcium silicate, and combinations thereof; and
  at least one aldehyde donor; and
synergistically scavenging mercaptans from the organic fluid where synergistically effective is defined as the amount of mercaptans scavenged is greater as compared with a combination where either the basic compound or the at least one aldehyde donor is absent, used in the same total amount.

2. The method of claim 1 where the aldehyde donor is selected from the group consisting of amine-aldehyde reaction products, alcohol-aldehyde reaction products, aldehyde oligomers, acrolein, acrolein trimer, glyoxal dimer, diazolidinyl urea, imidazolidinyl urea, dimethylol ethyleneurea, hydantoin, DMDM hydantoin, MDM hydantoin, 2-bromo-2-nitropropane-1,3-diol, quaternium-15 (1-(3-chloroallyl)-3,5,7-triaza-1-azoniaadamantane chloride), trishydroxymethylnitromethane, N-methylol-chloracetamide, (4,5-dihydroxy-1,3-bis(hydroxymethyl)-imidazolidin-2-one, methylated), dimethyloldihydroxyethyleneurea, dimethylolpropyleneurea, dimethylol urea, ethylene urea, glyoxal urea, polyoxymethylene urea, sodium hydroxmethyl glycinate, and combinations thereof.

3. The method of claim 1 where the weight ratio of the at least one basic compound to the at least one aldehyde donor in the combination ranges from about 1:20 to about 999:1.

4. The method of claim 1 where the synergistically effective amount of the combination present in the fluid ranges from about a mass ratio of about 50:1 to about 1:1, based on the mercaptans level in the fluid.

5. The method of claim 1 where the organic fluid comprises a hydrocarbon.

6. The method of claim 1 where the at least one aldehyde donor is selected from the group consisting of:
  amine-aldehyde reaction products selected from the group consisting of amine-aldehyde condensates selected from the group consisting of 3,3'-methylenebis-5-methyloxazolidine (MBO), monoethanol-amine (MEA) triazine, monomethylamine (MMA) triazine, and combinations thereof; and
  alcohol-aldehyde reaction products selected from the group consisting of alcohol-aldehyde condensates selected from the group consisting of butyl hemiformal, benzyl hemiformal, methoxymethanol, (ethylenedioxy) dimethanol (EDDM), and combinations thereof.

7. The method of claim 1 where the at least one basic compound and at least one aldehyde donor are added to the organic fluid separately.

8. The method of claim 1 where the organic fluid comprises an alkaline wash stream.

9. A composition for scavenging mercaptans from an organic fluid, the composition comprising:
  at least one basic compound selected from the group consisting of sodium hydroxide (NaOH), potassium hydroxide (KOH), calcium hydroxide, sodium methoxide ($CH_3NaO$), potassium methoxide, diethylenetriamine (DETA), triethylene tetramine, tetraethylenepentamine, sodium carbonate, potassium carbonate, calcium carbonate, sodium phosphate, potassium phosphate, calcium phosphate, sodium silicate, potassium silicate, calcium silicate, and combinations thereof; and
  at least one aldehyde donor selected from the group consisting of amine-aldehyde reaction products, alcohol-aldehyde reaction products, aldehyde oligomers, acrolein, acrolein trimer, glyoxal dimer, diazolidinyl urea, imidazolidinyl urea, dimethylol ethyleneurea, DMDM hydantoin, MDM hydantoin, 2-bromo-2-nitropropane-1,3-diol, quaternium-15 (1-(3-chloroallyl)-3,5,7-triaza-1-azoniaadamantane chloride), trishydroxymethylnitromethane, N-methylol-chloracetamide, (4,5-dihydroxy-1,3-bis(hydroxymethyl)-imidazolidin-2-one, methylated), dimethyloldihydroxyethyleneurea, dimethylolpropyleneurea, dimethylol urea, ethylene urea, glyoxal urea, polyoxymethylene urea, sodium hydroxmethyl glycinate, and combinations thereof.

10. The composition of claim 9 where the at least one aldehyde donor is selected from the group consisting of:
  amine-aldehyde reaction products selected from the group consisting of 3,3'-methylenebis-5-methyloxazolidine (MBO), monoethanol-amine (MEA) triazine, monomethylamine (MMA) triazine, and combinations thereof; and
  alcohol-aldehyde reaction products selected from the group consisting of alcohol-aldehyde condensates selected from the group consisting of butyl hemiformal, benzyl hemiformal, methoxymethanol, (ethylenedioxy) dimethanol (EDDM), and combinations thereof.

11. The composition of claim 9 where:
  the molar ratio of the at least one basic compound to the at least one aldehyde donor ranges from about 1:20 to about 999:1.

12. An organic fluid treated to scavenge mercaptans therefrom, comprising:
  an organic fluid comprising mercaptans; and
  a combination in a synergistically effective amount for synergistically scavenging mercaptans, where the combination comprises:
    at least one basic compound selected from the group consisting of sodium hydroxide (NaOH), potassium hydroxide (KOH), calcium hydroxide, sodium methoxide ($CH_3NaO$), potassium methoxide, sodium carbonate, potassium carbonate, calcium carbonate, sodium phosphate, potassium phosphate, calcium phosphate, sodium silicate, potassium silicate, calcium silicate, and combinations thereof; and
    at least one aldehyde donor;
  where synergistically effective is defined as the amount of mercaptans scavenged is greater as compared with a combination where either the basic compound or 3,3'-methylenebis-5-methyloxazolidine is absent, used in the same total amount.

13. The treated organic fluid of claim 12 where:
  the aldehyde donor is selected from the group consisting of amine-aldehyde reaction products, alcohol-aldehyde reaction products, aldehyde oligomers, acrolein, acrolein trimer, glyoxal dimer, diazolidinyl urea, imidazolidinyl urea, dimethylol ethyleneurea, hydantoin, DMDM hydantoin, MDM hydantoin, 2-bromo-2-nitropropane-1,3-diol, quaternium-15 (1-(3-chloroallyl)-3,5,7-triaza-1-azoniaadamantane chloride), trishydroxymethylnitromethane, N-methylolchloracetamide, (4,5-dihydroxy-1,3-bis(hydroxymethyl)-imidazolidin-2-one, methylated), dimethyloldihydroxyethyleneurea, dimethylolpropyleneurea, dimethylol urea, ethylene urea, glyoxal urea, polyoxymethylene urea, sodium hydroxmethyl glycinate, and combinations thereof.

14. The treated organic fluid of claim 12 where the weight ratio of the at least one basic compound to the at least one aldehyde donor in the combination ranges from about 1:20 to about 999:1.

15. The treated organic fluid of claim 12 where the synergistically effective amount of the combination present in the fluid ranges from about a mass ratio of 99:1 to 1:20, based on the mercaptans in the fluid.

16. The treated organic fluid of claim 12 where the organic fluid comprises a hydrocarbon.

17. The treated organic fluid of claim 12 where the at least one aldehyde donor is selected from the group consisting of:
   amine-aldehyde reaction products selected from the group consisting of amine-aldehyde condensates selected from the group consisting of 3,3'-methylenebis-5-methyloxazolidine (MBO), monoethanol-amine (MEA) triazine, monomethylamine (MMA) triazine, and combinations thereof; and
   alcohol-aldehyde reaction products selected from the group consisting of alcohol-aldehyde condensates selected from the group consisting of butyl hemiformal, benzyl hemiformal, methoxymethanol, (ethylenedioxy) dimethanol (EDDM), and combinations thereof.

18. The treated organic fluid of claim 12 where the organic fluid comprises an alkaline wash stream.

\* \* \* \* \*